(12) United States Patent
Hsu et al.

(10) Patent No.: US 11,320,727 B2
(45) Date of Patent: May 3, 2022

(54) LIGHT SOURCE MODULE AND PROJECTION APPARATUS

(71) Applicant: Coretronic Corporation, Hsin-Chu (TW)

(72) Inventors: Kun-Chen Hsu, Hsin-Chu (TW); Chin-Wen Huang, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 17/192,844

(22) Filed: Mar. 4, 2021

(65) Prior Publication Data

US 2021/0286247 A1   Sep. 16, 2021

(30) Foreign Application Priority Data

Mar. 13, 2020 (CN) .......................... 202010173654.X (51) Int. Cl.
*G03B 21/20* (2006.01)
*H04N 9/31* (2006.01)
*G02B 27/10* (2006.01)

(52) U.S. Cl.
CPC ....... *G03B 21/2013* (2013.01); *G02B 27/102* (2013.01); *G03B 21/2033* (2013.01);
(Continued)

(58) Field of Classification Search
CPC ............ G03B 21/2013; G03B 21/2033; G02B 27/102; H04N 9/3161; H04N 9/3164; H04N 9/3197
(Continued)

(56) References Cited

U.S. PATENT DOCUMENTS 7,980,706 B2   7/2011   Wang
9,004,699 B2   4/2015   Huang
(Continued)

FOREIGN PATENT DOCUMENTS

CN   204595412   8/2015
CN   104020632   8/2016
(Continued)

OTHER PUBLICATIONS

"Search Report of Europe Related Application, application No. 20217548.5", dated Jun. 23, 2021, p. 1-p. 9.
(Continued)

*Primary Examiner* — Jerry L Brooks
(74) *Attorney, Agent, or Firm* — JCIPRNET (57) ABSTRACT

A light source module and a projection apparatus comprising the same are provided. The light source module comprises a light source unit, a light splitting element, and a condenser lens. The light source unit is configured to provide first color light beams including a first sub-light beam and a third sub-light beam, and second color light beams including a second sub-light beam and a fourth sub-light beam. The light source unit comprises a first light source unit to provide the first and second sub-light beams, and a second light source unit to provide the third and fourth sub-light beams. One of the first sub-light beam and the third sub-light beam is transmitted to the condenser lens after being reflected by the light splitting element, and the other of the first sub-light beam and the third sub-light beam is transmitted to the condenser lens after passing through the light splitting element.

20 Claims, 9 Drawing Sheets

(52) U.S. Cl.
CPC ......... *H04N 9/3161* (2013.01); *H04N 9/3164* (2013.01); *H04N 9/3197* (2013.01)

(58) Field of Classification Search
USPC .......................................................... 353/31
See application file for complete search history.

(56) References Cited

U.S. PATENT DOCUMENTS

| | | | |
|---|---|---|---|
| 2005/0117337 A1 | 6/2005 | Ishii et al. | |
| 2009/0262309 A1 | 10/2009 | Yamauchi | |
| 2012/0133904 A1 | 5/2012 | Akiyama | |
| 2014/0354956 A1* | 12/2014 | Yamada | H04N 9/3167 353/20 |
| 2017/0176845 A1 | 6/2017 | Ogino | |
| 2019/0310539 A1 | 10/2019 | Yamagishi et al. | |
| 2021/0191250 A1 | 6/2021 | Kurita et al. | |

FOREIGN PATENT DOCUMENTS

| | | |
|---|---|---|
| CN | 107885021 | 4/2018 |
| CN | 208060924 | 11/2018 |
| CN | 209265161 | 8/2019 |
| CN | 211375295 | 8/2020 |
| CN | 211403092 | 9/2020 |
| TW | 201516555 | 5/2015 |
| TW | 201541181 | 11/2015 |
| WO | 2018196195 | 11/2018 |

OTHER PUBLICATIONS

"Office Action of Related U.S. Appl. No. 17/131,793", dated Dec. 8, 2021, pp. 1-27.

* cited by examiner

LIGHT SOURCE MODULE AND PROJECTION APPARATUS

CROSS-REFERENCE TO RELATED APPLICATION

This application claims the priority benefit of China application serial no. 202010173654.X, filed on Mar. 13, 2020. The entirety of the above-mentioned patent application is hereby incorporated by reference herein and made a part of this specification.

BACKGROUND

Technical Field

The disclosure relates to an optical module and an optical apparatus, and in particular to a light source module and a projection apparatus.

Description of Related Art

Recently, projection apparatus, based on solid-state light sources such as light-emitting diodes (LEDs) and laser diodes, is gaining a foothold in the market. Since laser diodes have a light-emitting efficiency higher than about 20%, in order to break through light source limitations of the light-emitting diodes, laser light sources have been gradually developed as the required light source for projectors.

In general, the projection apparatus, which uses the laser light source as the light source, includes optical modules such as a light combining module, a light filtering module, a light valve, a projection lens, etc. Specifically, the light filtering module is disposed on a rear optical path of the light combining module, such that different wavelengths of a color light from the combined module can be filtered out through the light filtering module, in order to purify the color and achieve the effect of color saturation. Afterwards, the color light is modulated by the light valve to project an image beam to the outside.

Furthermore, in the prior art, the solid-state light sources of different colors in the light combining module are respectively fixed to different light source units, and are combined with heat dissipation modules of different sizes or forms to dissipate heat and improve the light output efficiency of light source. However, in this way, it will cause the problem of excessive system volume, and after combining light, plural color lights are also prone to produce uneven color patch areas, resulting in uneven color of the projected image frame.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a light source module capable of providing illumination beam with good uniformity.

The disclosure provides a projection apparatus capable of providing a display image with good quality.

Other objects and advantages of the disclosure can be further understood from the technical features disclosed in the disclosure.

In order to achieve one or a portion of or all of the above objects or other objects, an embodiment of the disclosure provides a light source module, comprising a light source unit, a light splitting element, and a condenser lens. The light source unit is configured to provide a plurality of first color light beams and a plurality of second color light beams, and the light source unit comprises a first light source unit and a second light source unit. The first light source unit is configured to provide a first sub-light beam and a second sub-light beam, wherein the first sub-light beam and the second sub-light beam are emitted from the first light source unit along a same direction. The second light source unit is configured to provide a third sub-light beam and a fourth sub-light beam, wherein the third sub-light beam and the fourth sub-light beam are emitted from the second light source unit along a same direction. The plurality of first color light beams comprise the first sub-light beam and the third sub-light beam, and the plurality of second color light beams comprise the second sub-light beam and the fourth sub-light beam. The light splitting element is located on transmitting paths of the plurality of first color light beams and the plurality of second color light beams. The condenser lens is located on the transmitting paths of the plurality of first color light beams and the plurality of second color light beams, wherein one of the first sub-light beam and the third sub-light beam is transmitted to the condenser lens after being reflected by the light splitting element, and the other of the first sub-light beam and the third sub-light beam is transmitted to the condenser lens after passing through the light splitting element.

In order to achieve one or a portion of or all of the above objects or other objects, an embodiment of the disclosure provides a projection apparatus comprising the aforementioned light source module, a light valve and a projection lens. The light source module is configured to provide an illumination beam. The light valve is located on a transmission path of the illumination beam and is configured to convert the illumination beam into an image beam. The projection lens is located on a transmission path of the image beam and is configured to project the image beam out of the projection apparatus.

Based on the above, the embodiments of the disclosure have at least one of the following advantages or effects. In an embodiment of the invention, the projection apparatus and the light source module are set up so that a plurality of first color light beams and a plurality of second color light beams incident to the light splitting element from different directions are transmitted to the condenser lens along the same direction after passing through the light splitting element, and the distribution positions of the plurality of first color light beams and the plurality of second color light beams are symmetrical with respect to the optical axis passing through the condenser lens. Therefore, the illumination beam formed by the condenser lens has good uniformity. In this way, the projection apparatus using the light source module can provide a uniform color display image frame, thereby improving the image quality and the user's visual perception.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
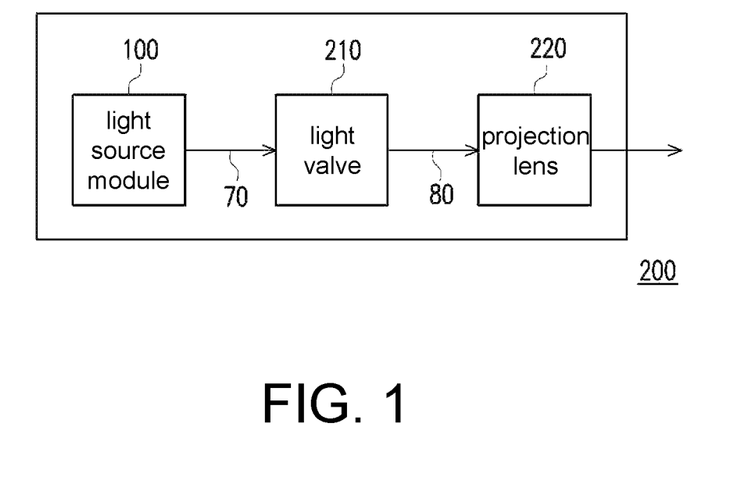
FIG. 1 is a block diagram of a projection apparatus according to an embodiment of the disclosure.
Figure 2A:
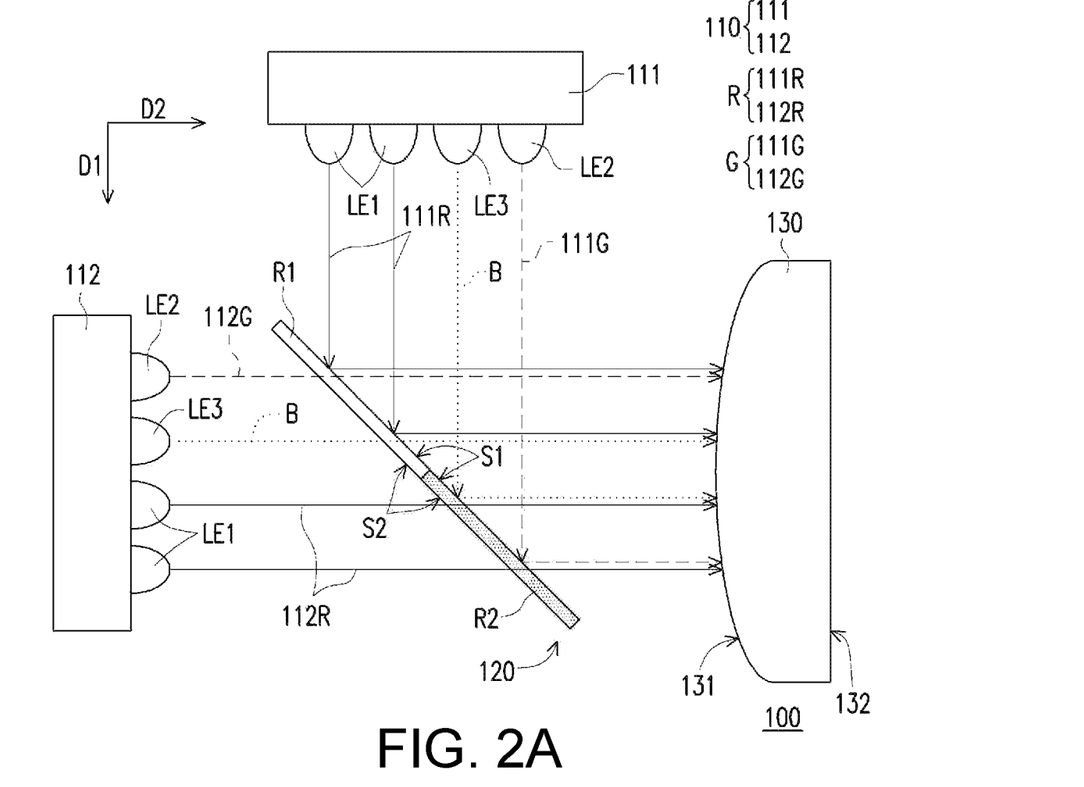
FIG. 2A is a schematic structural diagram of a light source module according to an embodiment of the disclosure.
Figure 2B:
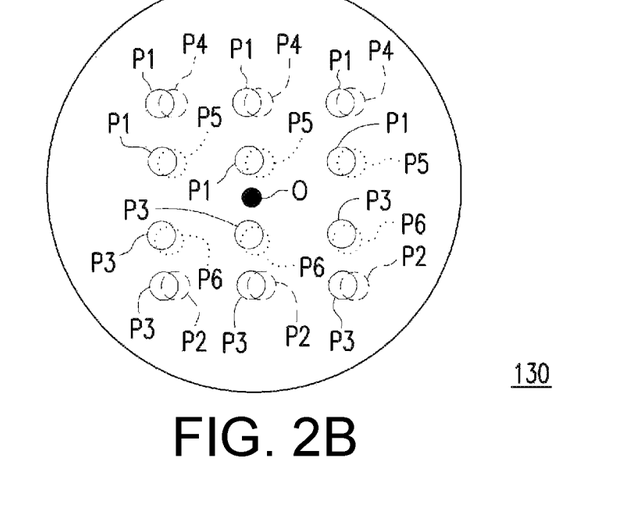
FIG. 2B is a top view of the condenser lens of FIG. 2A.

FIG. 1 is a block diagram of a projection apparatus according to an embodiment of the disclosure. FIG. 2A is a schematic structural diagram of a light source module according to an embodiment of the disclosure. FIG. 2B is a top view of the condenser lens of FIG. 2A. Referring to FIG. 1, in this embodiment, the projection apparatus 200 includes a light source module 100, a light valve 210, and a projection lens 220. The light source module 100 is configured to provide an illumination beam 70. Moreover, as shown in FIG. 1, in this embodiment, the light valve 210 is located on the transmitting path of the illumination beam 70 and is capable of converting the illumination beam 70 into an image beam 80. The projection lens 220 is located on the transmitting path of the image beam 80, and the image beam 80 can be projected a screen or a wall (not shown) to form an image frame. After the illumination beam 70 is incident on the light valve 210, the light valve 210 can convert the illumination beam 70 into the image beam 80 containing multiple colors and transmit the image beam 80 to the projection lens 220, thus forming a color image frame on the screen. For example, in this embodiment, the light valve 210 is, for example, a digital micro-mirror device (DMD) or a liquid crystal-on-silicon panel (LCOS panel). However, in other embodiments, the light valve 210 may also be a transparent liquid crystal panel, an electro-optical modulator, a magneto-optical modulator, an acousto-optic modulator (AOM) or other transmissive LCD panels or beam modulators. In this embodiment, the projection lens 220 includes, for example, a combination of one or more optical lenses with diopters, such as various combinations of non-planar lenses such as biconcave lenses, biconvex lenses, meniscus lenses, convex-concave lenses, plano-convex lenses, plano-concave lenses. In an embodiment, the projection lens 220 may also include a planar optical lens, so as to reflect or transmit the image beam 80 from the light valve 210 to a projection target, such as a screen or a wall. The disclosure does not limit the profile and type of the projection lens 220.

Specifically, as shown in FIG. 2A, in this embodiment, the light source module 100 includes a light source unit 110, a light splitting element 120, and a condenser lens 130. In this embodiment, neither semi-reflecting element nor dichroic mirror is provided between the light splitting element 120 and the condenser lens 130 (e.g., on the transmitting path of light beam), but the disclosure is not limited thereto. The light source unit 110 includes a first light source unit 111 and a second light source unit 112, which are configured to provide multiple first color light beams R and multiple second color light beams G. Furthermore, as shown in FIG. 2A, in this embodiment, the first color light beams R includes first sub-light beams 111R and third sub-light beams 112R, and the second color light beams G includes second sub-light beams 111G and fourth sub-light beams 112G. For example, the emission wavelength of the first color light beams R is greater than the emission wavelength of the second color light beams G. Further, in this embodiment, the first color light beams R may be red light beams, and the second color light beams G may be green light beams. Furthermore, in this embodiment, the first light source unit 111 and the second light source unit 112 may be laser light source units 110, and both of the first color light beams R and the second color light beams G are laser beams.

Specifically, as shown in FIG. 2A, in this embodiment, each of the first light source unit 111 and the second light source unit 112 includes multiple first light emitting devices LE1, to provide the first sub-light beams 111R and the third sub-light beams 112R, and each of the first light source unit 111 and the second light source unit 112 also includes multiple second light emitting devices LE2, to provide the second sub-light beams 111G and the fourth sub-light beams 112G, respectively. That is to say, in this embodiment, the first light source unit 111 provides two different color beams by providing the first sub-light beams 111R and the second sub-light beams 111G, and the second light source unit 112 also provides two different color beams by providing the third sub-light beams 112R and the fourth sub-light beams 112G. For example, in this embodiment, the first light emitting devices LE1 may be red laser diodes, and the second light emitting diode LE2 may be green laser diodes, but the disclosure is not limited thereto. In this way, the first light source unit 111 and the second light source unit 112 can be provided with the same light source configuration, which is beneficial to reduce the complexity of producing the light source module or the projection apparatus.

On the other hand, as shown in FIG. 2A, in this embodiment, the light source unit 110, including the first light source unit 111 and the second light source unit 112, is also configured to provide at least one third color light beam B. In other words, the first light source unit 111 and the second light source unit 112 may further include multiple third light emitting devices LE3 for providing the third color light beams B. For example, the emission wavelength of the third color light beams B is smaller than the emission wavelengths of the first color light beams R and the second color light beams G, and, as shown in FIG. 2A, in this embodiment, the positions of the third color light beams B are located between the first color light beams R and the second color light beams G.

Further, as shown in FIG. 2A, in this embodiment, the light splitting element 120 is located on the transmission paths of the first color light beams R and the second color light beams G, and the light splitting element 120 has a first region R1 and a second region R2, which are corresponding to the first light source unit 111 and the second light source unit 112. Specifically, as shown in FIG. 2A, when the first sub-light beams 111R and the second sub-light beams 111G are emitted from the first light source unit 111 along the same direction (i.e., the first direction D1), and the third sub-light beams 112R and the fourth sub-light beams 112G are emitted from the second light source unit 112 along the same direction (i.e., the second direction D2), the first sub-light beams 111R and the fourth sub-light beams 112G are incident on one of the first region R1 and the second region R2 of the light splitting element 120, and the second sub-light beams 111G and the third sub-light beams 112R are incident on the other of the first region R1 and the second region R2 of the light splitting element 120. In addition, as shown in FIG. 2A, the at least one third color light beam B provided by the second light source unit 112 is incident on one of the first region R1 and the second region R2 of the light splitting element 120, and the at least one third color light beam B provided by the first light source unit 111 is incident on the other of the first region R1 and the second region R2 of the light splitting element 120.

More specifically, as shown in FIG. 2A, in this embodiment, the first sub-light beams 111R provided by the first light source unit 111 and the at least one third color light beam B and the fourth sub-light beams 112G provided by the second light source unit 112 are incident on the first region R1 of the light splitting element 120; and, the at least one third color light beam B and the second sub-light beams 111G provided by the first light source unit 111 and the third sub-light beams 112R provided by the second light source unit 112 are incident on the second region R2 of the light splitting element 120. However, the disclosure is not limited thereto. In another embodiment (not shown), the first sub-light beams 111R provided by the first light source unit 111 and the at least one third color light beam B and the fourth sub-light beams 112G provided by the second light source unit 112 may be incident on the second region R2 of the light splitting element 120; and, the at least one third color light beam B and the second sub-light beams 111G provided by the first light source unit 111 and the third sub-light beams 112R provided by the second light source unit 112 are incident on the light second region R1 of splitting element 120.

In this embodiment, the first color light beams R are, for example, red light beams, the second color light beams G are, for example, green light beams, and the third color light beams B are, for example, blue light beams. As shown in FIG. 2A, in this embodiment, the first region R1 of the light splitting element 120 can reflect the first color light beams R, and allow the second color light beams G and the at least one third color light beam B to pass through. The second region R2 of the splitting element 120 can allow the first color light beams R and reflect the second color light beams G and at least one third color light beam B to pass through. In other words, the first region R1 of the light splitting element 120 is, for example, a dichroic mirror having red light reflection effect, which allows the blue light and the green light to pass through and reflects the red light. The second region R2 of the light splitting element 120 is, for example, a dichroic mirror having blue and green light reflection effect, which allows the red light to pass through, and reflects the blue light and the green light.

It is noted that, in this embodiment, the light splitting element 120 provides a "reflection" effect on the light beam with a specific wavelength range, and the light splitting element 120 has a reflectance of greater than 80% and a transmittance of less than 20% to the incident beam. The light splitting element 120 provides a "transmission" effect on the light beam with a specific wavelength range, and the light splitting element 120 has a transmittance of greater than 80% and a reflectance of less than 20% to the incident beam.

Furthermore, as shown in FIG. 2A, in this embodiment, the light splitting element 120 has a first surface S1 and a second surface S2 opposite to each other, and the first surface S1 faces the condenser lens 130. For example, in this embodiment, the first light source unit 111 faces the first surface S1, and the second light source unit 112 faces the second surface S2. In other words, the first light source unit 111 and the second light source unit 112 are located on two opposite sides of the light splitting element 120, respectively. The first sub-light beams 111R, the at least one third color light beam B and the second sub-light beams 111G provided by the first light source unit 111 are incident on the first surface S1 of the light splitting element 120. And, the at least one third color light beam B, the third sub-light beams 112R and the fourth sub-light beams 112G provided by the second light source unit 112 are incident on the second surface S2 of the light splitting element 120.

Thus, as shown in FIG. 2A, in this embodiment, the first surface S1 of the light splitting element 120 located in the first region R1 reflects the first color light beams R (i.e., the first sub-light beams 111R), and allows the second color light beams G (i.e., the fourth sub-light beams 112G) provided by the second light source unit 112 and the at least one third color light beam B provided by the second light source unit 112 to pass through. On the other hand, the first surface S1 of the light splitting element 120 located in the second region R2 reflects the second color light beams G (i.e., the second sub-light beams 111G) and the at least one third color light beam B provided by the first light source unit 111, and allows the first color light beams R (i.e., the third sub-light beams 112R) to pass through. Thus, as shown in FIG. 2A, the first color light beams R, the second color light beams G, and the at least one third color light beam B exit the light splitting element 120 via the first surface S1.

In other words, as shown in FIG. 2A, in this embodiment, the first color light beams R (i.e., the first sub-light beams 111R, the third sub-light beams 112R), the second color light beams G (i.e., the second sub-light beams 111G, the fourth sub-light beams 112G) and the at least one third color light beam B incident on the light splitting element 120 from different directions through different surfaces can be transmitted to the condenser lens 130 along the same direction (e.g., the second direction D2) after passing through the light splitting element 120.

More specifically, as shown in FIG. 2A and FIG. 2B, in this embodiment, the condenser lens 130 is located on the transmitting paths of the first color light beams R and the second color light beams G. FIG. 2B shows the light spot distribution on the light incident surface 131 of the condenser lens 130, or the light beam distribution on the light exit surface 132 of the condenser lens 130. The first sub-light beams 111R are transmitted to the first positions P1 of the condenser lens 130, the second sub-light beams 111G are transmitted to the second positions P2 of the condenser lens 130, the third sub-light beams 112R are transmitted to the third positions P3 of the condenser lens 130, and the fourth sub-light beams 112G are transmitted to the fourth positions P4 of the condenser lens 130. The first positions P1 and the third positions P3 are symmetrical to each other by taking a line passing through the optical axis O of the condenser lens 130 as a symmetry axis, and the second positions P2 and the fourth positions P4 are symmetrical to each other by taking the line passing through the optical axis O of the condenser lens 130 as the symmetry axis. In addition, as shown in FIG. 2B, the at least one third color light beam B provided by the first light source unit 111 can be transmitted to the sixth positions P6 of the condenser lens 130, and the at least one third color light beam B provided by the second light source unit 112 can be transmitted to the fifth positions P5 of the condenser lens 130, and the fifth positions P5 and the sixth positions P6 are also symmetrical to each other by taking the line passing through the optical axis O of the condenser lens 130 as the symmetry axis. In addition, the line passing through the optical axis O is parallel to the boundary between the first region R1 and the second region R2. To more specific, in FIG. 2B, the line passing through the optical axis O in FIG. 2B is perpendicular to the optical axis O and parallel to the sheet surface of FIG. 2B for dividing the upper and lower regions of the condenser lens 130. With reference to FIG. 2A, the dividing line between the first region R1 and the second region R2 is defined as a center line of the joint surface (not shown) of the first region R1 and the second region R2, wherein the center line is perpendicular to the sheet surface of FIG. 2A.

As such, due to distribution positions of the first color light beams R (i.e., the first sub-light beams 111R, the third sub-light beams 112R) and the second color light beams G (i.e., the second sub-light beams 111G, the fourth sub-light beams 112G) and the at least one third color light beam B are symmetrical to each other by taking the line passing through the optical axis O of the condenser lens 130 as the symmetry axis, the above-mentioned multiple beams can be uniformly condensed through the condenser lens 130 to become the illumination beam 70, and then transmitted to subsequent optical components, such as the light valve 210 and the projection lens 220.

In this way, the projection apparatus 200 and the light source module 100 are provided with the first light source unit 111, the second light source unit 112 and the light splitting element 120 corresponding with each other, so that the first color light beams R and the second color light beams G incident on the light splitting element 120 from different directions can be transmitted to the condenser lens 130 in the same direction after passing through the light splitting element 120. The distribution positions of the first color light beams R and the second color light beams G are symmetrical to each other by taking the line passing through the optical axis O on the light incident surface 131 (or the light exit surface 132) of the condenser lens 130 as a symmetric axis, and the line passing through the optical axis O is parallel to the dividing line between the first region R1 and the second region R2. In this way, the illumination beam 70 uniformly formed by the condenser lens 130 can have good uniformity. Thus, the projection apparatus 200 using the light source module 100 is capable of providing a uniform color display image frame, thereby improving the image quality and the user's visual perception.

Specifically, in order to achieve a better color gamut range, the brightness of the plurality of light beams can be adjusted according to the range of emission wavelength, to provide a white screen with a desired color temperature and good uniformity. For example, the emission wavelength of the first color light beams R is between 638 nm and 642 nm, the emission wavelength of the second color light beams G is between 525 nm and 535 nm, and the emission wavelength of the third color light beams B is between 455 nm and 465 nm. Furthermore, the ratio of the lumens of the second color light beams G to the lumens of the first color light beams R is between 2.54 and 3.84. The ratio of the lumens of the at least one third color light beam B to the lumens of the first color light beams R is between 0.11 and 0.34. In this way, the projection apparatus 200 can provide a white screen with a color temperature ranging from 6500K to 10510K by adjusting the emission wavelengths of the first color light beams R, the second color light beams G and the third color light beam B, and the brightness of the first color light beams R, the second color light beams G and the third color light beam B.

In addition, in the foregoing embodiments, although the light source module 100 takes the first surface S1 of the first light source unit 111 facing the light splitting element 120 as an example, the disclosure is not limited thereto. In other embodiments, the second light source unit 112 facing the first surface S1 can be provided, and the light splitting functions of the first region R1 and the second region R2 of the light splitting element 120 can be adjusted accordingly, to achieve functions similar to the previously described light source module 100, which will be illustrated by other embodiments below.

Figure 3:
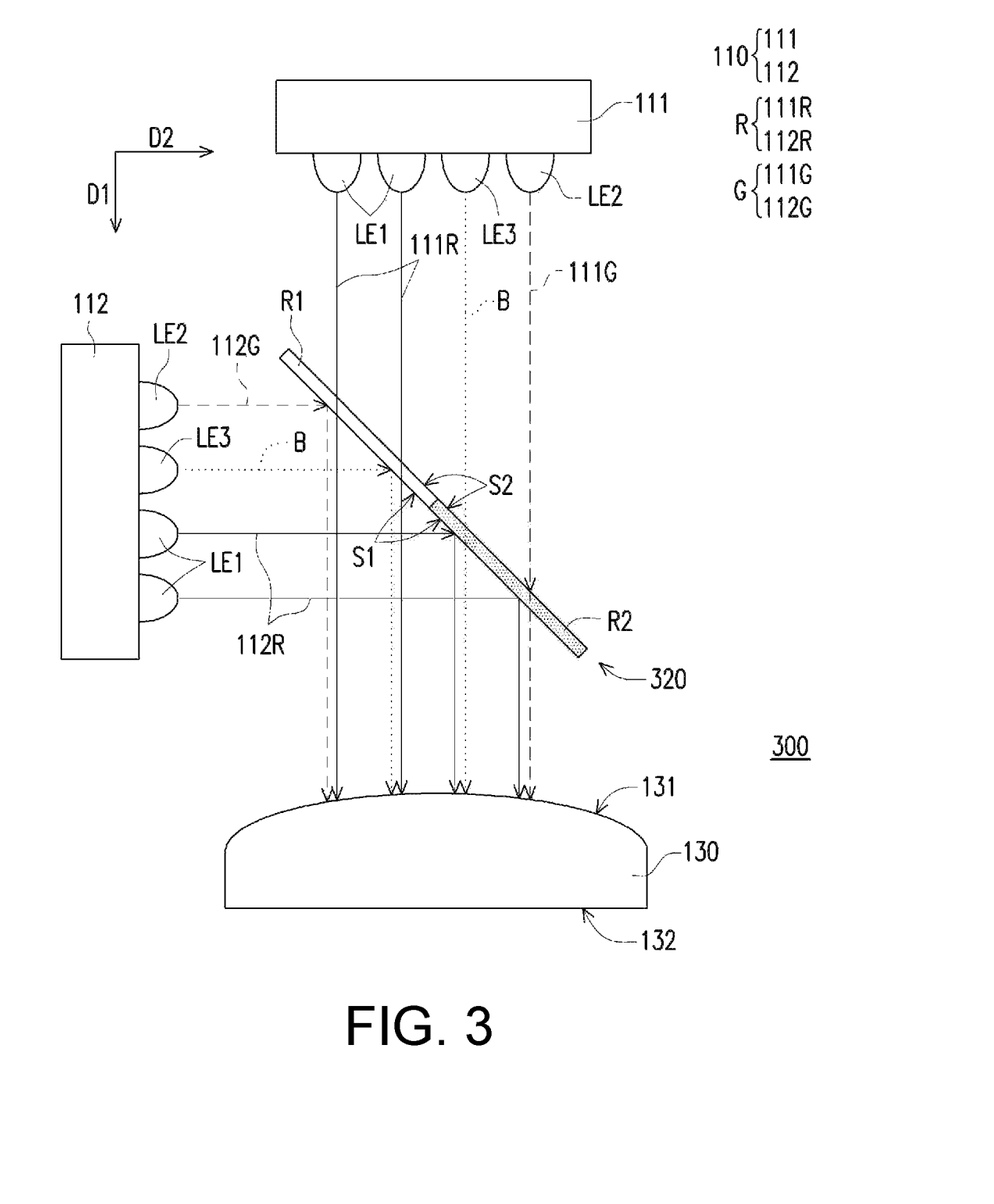
FIG. 3 is a schematic structural diagram of another light source module according to an embodiment of the disclosure.

FIG. 3 is a schematic structural diagram of another light source module according to an embodiment of the disclosure. Referring to FIG. 3, the light source module 300 of FIG. 3 is similar to the light source module 100 of FIG. 2A, and the differences are as follows. As shown in FIG. 3, in this embodiment, the second light source unit 112 faces the first surface S1 and the first light source unit 111 faces the second surface S2. Furthermore, as shown in FIG. 3, in this embodiment, the first region R1 of the light splitting element 320 can allow the first color light beams R to pass through and reflect the second color light beams G and the at least one third color light beam B; the second region R2 of the light splitting element 320 can reflect the first color light beams R, and allow the second color light beams G and the at least one third color light beam B to pass through. In other words, the first region R1 of the light splitting element 320 is, for example, a dichroic mirror having blue and green light reflection effect, which allows the red light to pass through and reflects the blue light and the green light. The second region R2 of the light splitting element 320 is, for example, a dichroic mirror having red light reflection effect, which allows the blue light and the green light to pass through and reflects the red light.

Thus, as shown in FIG. 3, in this embodiment, the first surface S1 of the light splitting element 320 located in the first region R1 reflects the second color light beams G (i.e., the fourth sub-light beams 112G) and the at least one third color light beam B provided by the second light source unit 112, and allows the first color light beams R (i.e., the first sub-light beams 111R) provided by the first light source unit 111 to pass through. On the other hand, the first surface S1 of the light splitting element 320 located in the second region R2 reflects the first color light beams R (i.e., the third sub-light beams 112R) provided by the second light source unit 112, and allows the second color light beams G (i.e., the second sub-light beams 111G) and the at least one third color light beam B provided by the first light source unit 111 to pass through. In this way, as shown in FIG. 3, the first color light beams R, the second color light beams G and the at least one third color light beam B exit the light splitting element 320 via the first surface S1 and are transmitted to the condenser lens 130.

In this way, as shown in FIG. 3, the projection apparatus 300 is provided with the first light source unit 111, the second light source unit 112 and the light splitting element 320 corresponding with each other, so that the first color light beams R and the second color light beams G incident on the light splitting element 320 from different directions can be transmitted to the condenser lens 130 in the same direction after passing through the light splitting element 320. The distribution positions of the first color light beams R and the second color light beams G are symmetrical to each other by taking the line passing through the optical axis on the light incident surface 131 (or the light exit surface 132) of the condenser lens 130 as a symmetric axis, and the line passing through the optical axis is parallel to the dividing line between the first region R1 and the second region R2. In this way, the illumination beam 70 uniformly formed by the condenser lens 130 can have good uniformity and achieve functions and advantages similar to the aforementioned light source module 100, which are not repeated here. Furthermore, when the light source module 300 is applied to the projection apparatus 200, the projection apparatus 200 is capable of providing a uniform color display image frame, thereby improving the image quality and the user's visual perception, to achieve the aforementioned functions and advantages, which are not repeated here.

Figure 4:
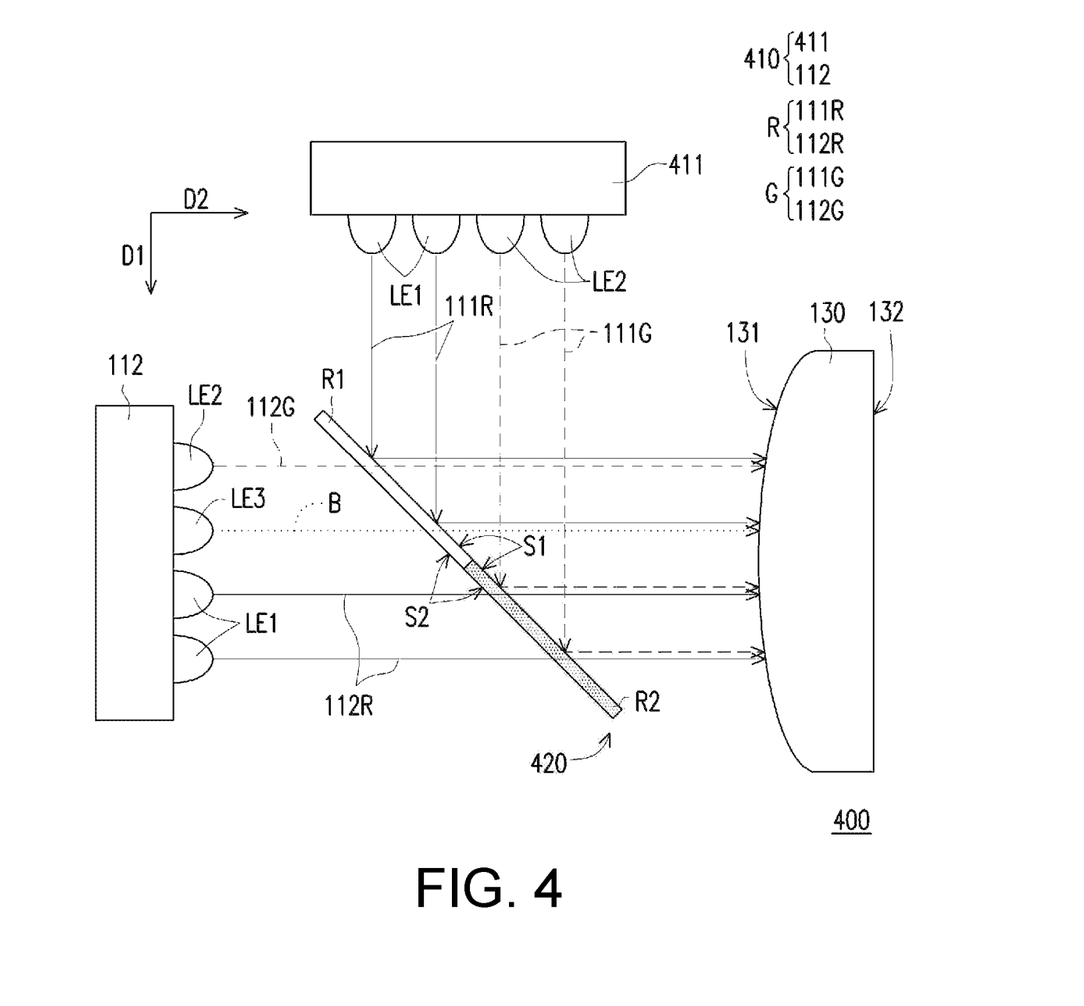
FIG. 4 is a schematic structural diagram of further another light source module according to an embodiment of the disclosure.

FIG. 4 is a schematic structural diagram of further another light source module according to an embodiment of the disclosure. Referring to FIG. 4, the light source module 400 of FIG. 4 is similar to the light source module 100 of FIG. 2A, and the differences are as follows. In this embodiment, at least one third color light beam B is provided by the first light source unit or the second light source unit. In other words, only one of the first light source unit and the second light source unit provides the at least a third color light beam B. And, for example, as shown in FIG. 4, in this embodiment, only the second light source unit 112 provides the at least one third color light beam B, and the first light source unit 411 does not provide the third color light beam B, and when the second light source unit 112 provides the at least one third color light beam B, the at least one third color light beam B is incident on the first region R1 of the light splitting element 420 and passes through the light splitting element 420. Since the third color light beam B in this embodiment is not incident on the second region R2 of the light splitting element 420, therefore, the second region R2 of the light splitting element 420 can be provided without blue light reflection effect, and can be a dichroic mirror with green light reflection effect. Therefore, coating process of the light splitting element 420 can be simplified, while the disclosure is not limited thereto. In another embodiment not shown, if the first light source unit provides the at least one third color light beam B, and the second light source unit does not provide the third color light beam B, the at least one third color light beam B is incident on the second region R2 of the light splitting element 420 and then reflected by the light splitting element 420. Since the third color light beam B in this embodiment is not incident on the first region R1 of the light splitting element 420, similarly, the first region R1 of the light splitting element 420 can be provided without any optical effect or restriction on blue light, so that the coating process of the light splitting element 420 can also be simplified.

In this way, as shown in FIG. 4, the first color light beams R, the second color light beams G and the at least one third color light beam B exit the light splitting element 420 via the first surface S1 and are transmitted to the condenser lens 130. Furthermore, the light source module 100 is provided with the first light source unit 411, the second light source unit 112 and the light splitting element 420 corresponding with each other, so that the first color light beams R and the second color light beams G incident on the light splitting element 420 from different directions can be transmitted to the condenser lens 130 in the same direction after passing through the light splitting element 420. In the embodiment, the distribution positions of the first color light beams R are symmetrical to each other by taking the line passing through the optical axis on the light incident surface 131 (or the light exit surface 132) of the condenser lens 130 as a symmetric axis, and the line passing through the optical axis is parallel to the dividing line between the first region R1 and the second region R2. In this way, the illumination beam 70 uniformly formed by the condenser lens 130 can have good uniformity and achieve functions and advantages similar to the aforementioned light source module 100, which are not repeated here. Furthermore, when the light source module 400 of FIG. 4 is applied to the projection apparatus 200, the projection apparatus 200 is capable of providing a uniform color display image frame, thereby improving the image quality and the user's visual perception, to achieve the aforementioned functions and advantages, which are not repeated here.

Figure 5:
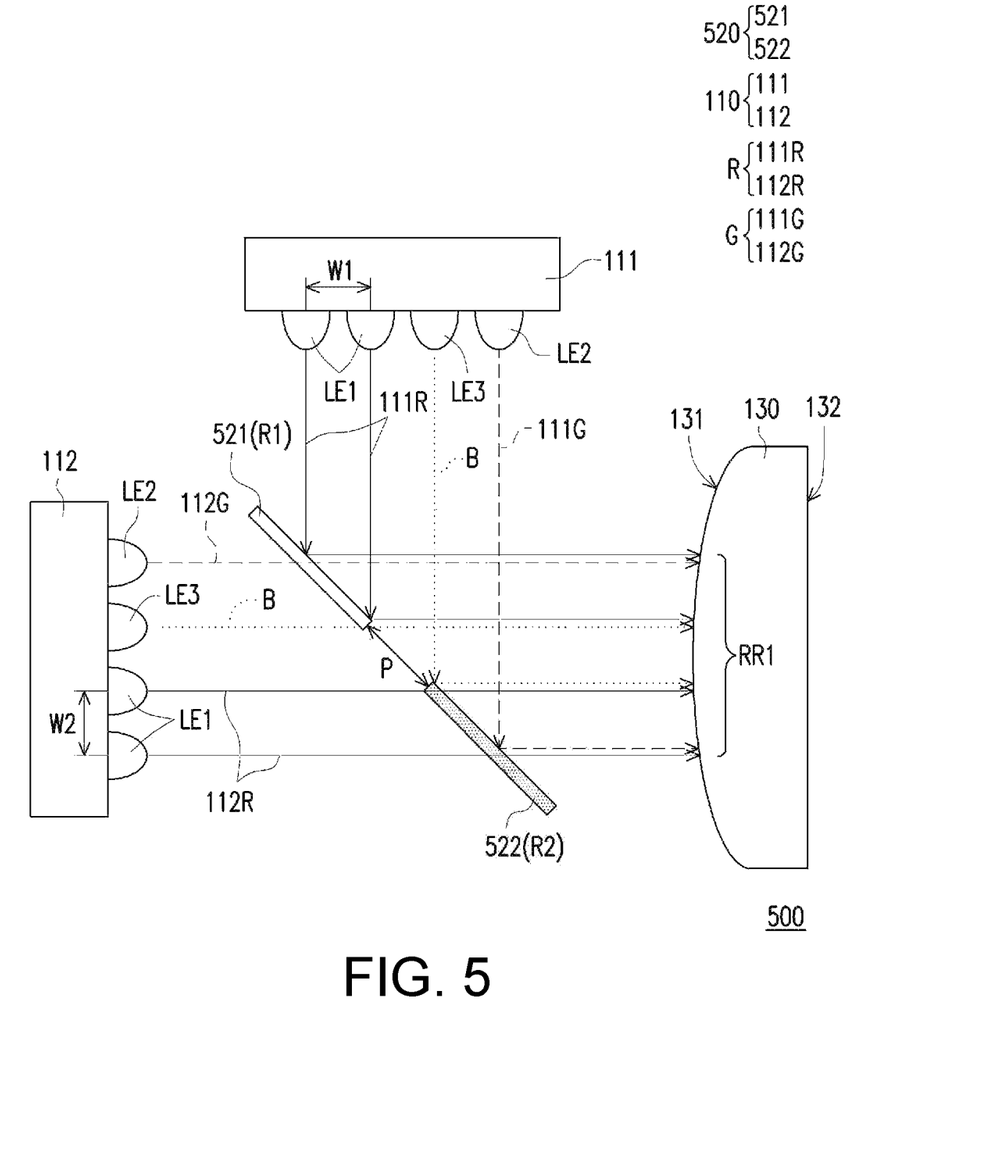
FIG. 5 is a schematic structural diagram of further another light source module according to an embodiment of the disclosure.

FIG. 5 is a schematic structural diagram of further another light source module according to an embodiment of the disclosure. Referring to FIG. 5, the light source module 500 of FIG. 5 is similar to the light source module 100 of FIG. 2A, and the differences are as follows. As shown in FIG. 5, in this embodiment, the light splitting element 520 includes a first sub-light splitting element 521 and a second sub-light splitting element 522, the first sub-light splitting element 521 is provided with a first region R1, and the second sub-light splitting element 522 is provided with a second region R2, and the first sub-light splitting element 521 and the second sub-light splitting element 522 are provided with a spacing P therebetween. More specifically, as shown in FIG. 5, in this embodiment, the maximum distance between the first light emitting devices LE1 of the first light source unit 111 is a first size W1, and the maximum distance between the first light emitting devices LE1 of the second light source unit 112 is a second size W2. Due to the spacing P between the first sub-light splitting element 521 and the second sub-light splitting element 522, the first positions P1 and the third positions P3 of the first sub-light beams 111R and the third sub-light beams 112R form a first color distribution area RR1 (e.g., the maximum distance between the first positions P1 and the third positions P3) on the condenser lens 130, and the size of the first color distribution area RR1 is greater than or equal to the sum of the first size W1 and the second size W2.

In this way, since the first sub-light splitting element 521 and the second sub-light splitting element 522 of the light splitting element 520 are independent from each other, they are conducive to manufacture. Furthermore, as shown in FIG. 5, the light source module 500 is provided with the first light source unit 111, the second light source unit 112, the first sub-light splitting element 521 and the second sub-light splitting element 522 corresponding with each other, so that the first color light beams R and the second color light beams G incident on the light splitting element 520 from different directions can be transmitted to the condenser lens 130 in the same direction after passing through the light splitting element 520. And, the distribution positions of the first color light beams R and the second color light beams G are symmetrical to each other by taking the line passing through the optical axis on the light incident surface 131 (or the light exit surface 132) of the condenser lens 130 as a symmetric axis, and the line passing through the optical axis is parallel to an extending direction of the spacing P between the first sub-light splitting element 521 and the second sub-light splitting element 522. In this way, the illumination beam 70 uniformly formed by the condenser lens 130 can have good uniformity and achieve functions and advantages similar to the aforementioned light source module 100, which are not repeated here. Furthermore, when the light source module 500 of FIG. 5 is applied to the projection apparatus 200, the projection apparatus 200 is capable of providing a uniform color display image frame, thereby improving the image quality and the user's visual perception, to achieve the aforementioned functions and advantages, which are not repeated here.

Figure 6A:
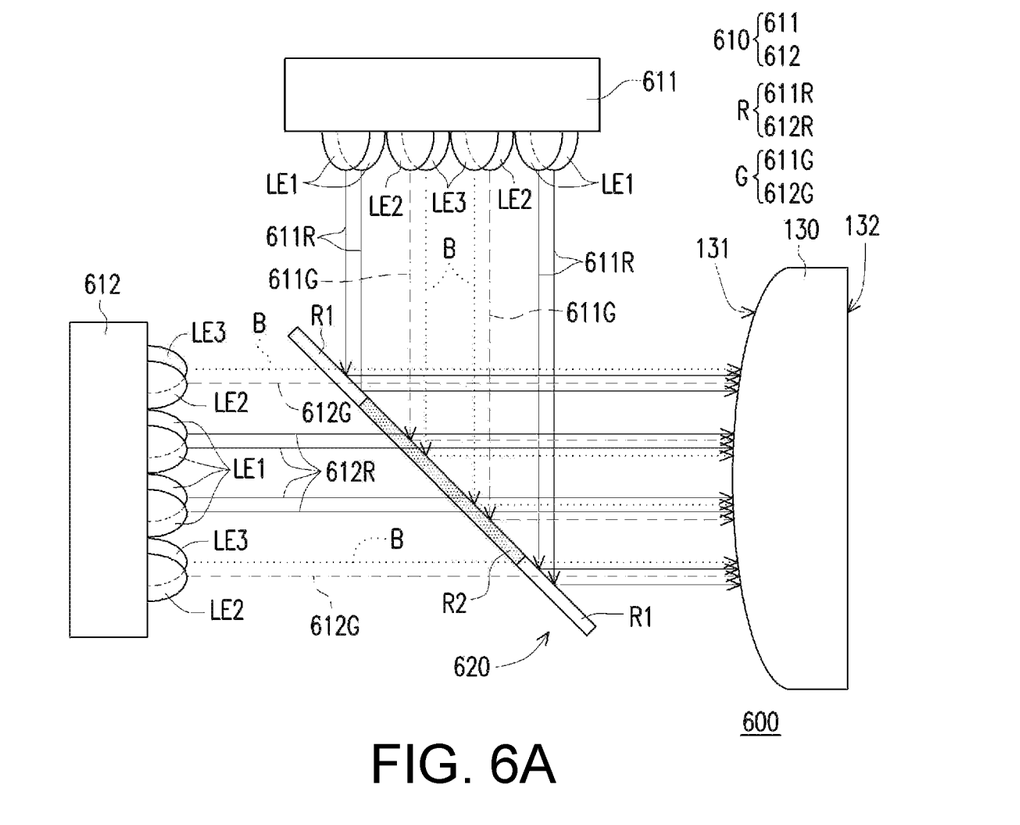
FIG. 6A is a schematic structural diagram of further another light source module according to an embodiment of the disclosure.
Figure 6B:
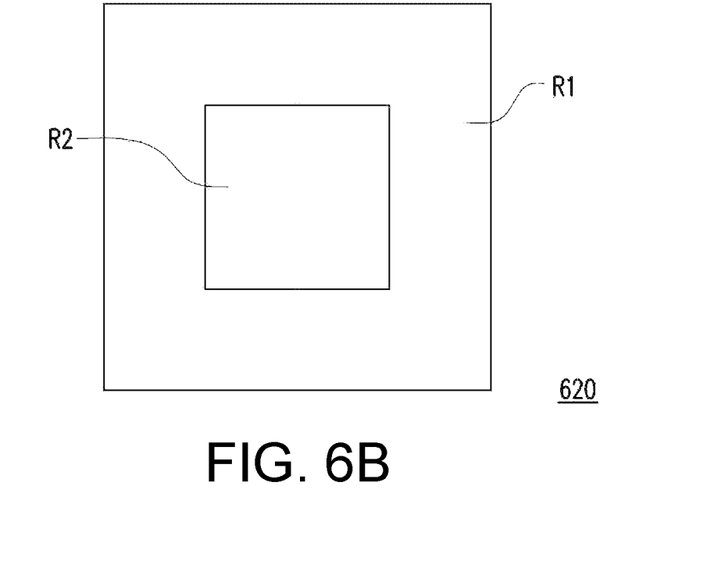
FIG. 6B is a top view of the light splitting element of FIG. 6A.
Figure 6C:
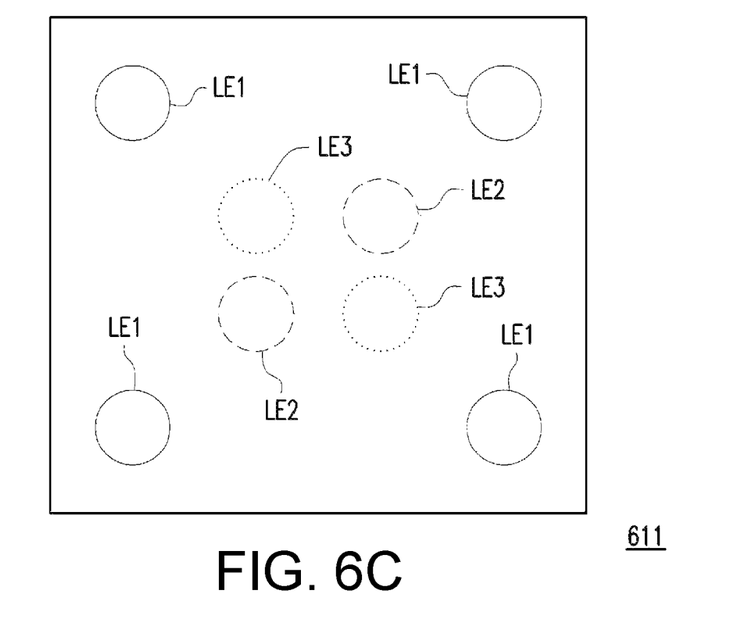
FIG. 6C is a top view of the first light source unit of FIG. 6A.
Figure 6D:
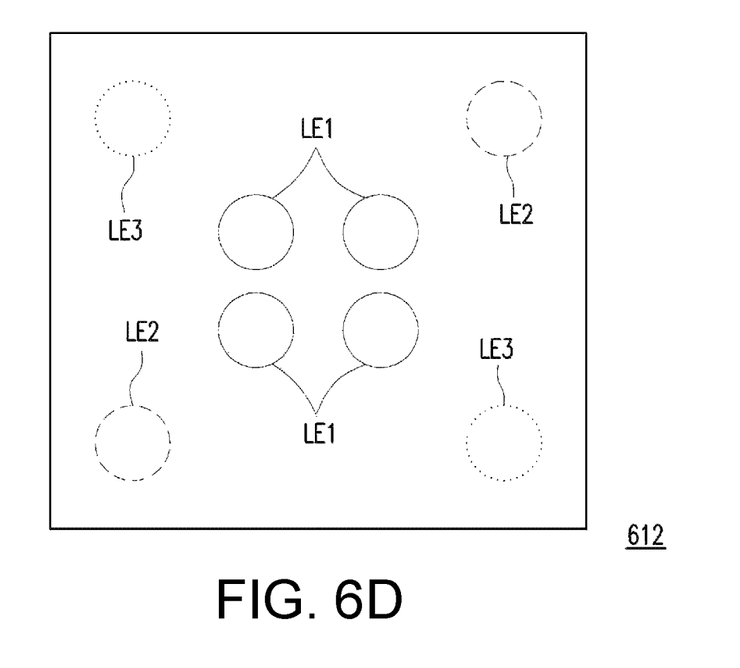
FIG. 6D is a top view of the second light source unit of FIG. 6A.

FIG. 6A is a schematic structural diagram of further another light source module according to an embodiment of the disclosure. FIG. 6B is a top view of the light splitting element of FIG. 6A. FIG. 6C is a top view of the first light source unit of FIG. 6A. FIG. 6D is a top view of the second light source unit of FIG. 6A. Referring to FIG. 6A, the light source module 600 of FIG. 6A is similar to the light source module 100 of FIG. 2A, and the differences are as follows. More specifically, in this embodiment, one of the first region R1 and the second region R2 of the light splitting element 620 is located in the center of the light splitting element 620, and the other of the first region R1 and the second region R2 surrounds the one of the first region R1 and second region R2.

For example, as shown in FIGS. 6A and 6B, in this embodiment, the second region R2 is located in the center of light splitting element 620, and the first region R1 surrounds the second region R2. In addition, the first light source unit 611 and the second light source unit 612 of the light source unit 610 are provided with the first light emitting devices LE1, the second light emitting devices LE2 and the third light emitting devices LE3 in corresponding to the first region R1 and the second region R2 of the light splitting element 620. For example, as shown in FIG. 6A, FIG. 6C and FIG. 6D, the first light emitting devices LE1 of the first light source unit 611 and the second light emitting devices LE2 and the third light emitting devices LE3 of the second light source unit 612 are arranged in corresponding to the first region R1 of the light splitting element 620, and thus the first sub-light beams 611R provided by the first light source unit 611 and the fourth sub-light beams 612G and the third color light beams B provided by the second light source unit 612 can be incident on the first region R1 of the light splitting element 620. On the other hand, the second light emitting devices LE2 and the third light emitting devices LE3 of the first light source unit 611 and the first light emitting devices LE1 of the second light source unit 612 are arranged in corresponding to the second region R2 of the light splitting element 620, and the second sub-light beams 611G provided by the first light source unit 611 and the third sub-light beams 612R and the third color light beams B provided by the second light source unit 612 can be incident on the second region R2 of the light splitting element 620.

It is not that in FIG. 6A, in order to facilitate the drawing, the first light emitting devices LE1, the second light emitting devices LE2 and the third light emitting devices LE3 are shown in a partially overlapping way to indicate the position of the elements and the beam. However, in essence, as shown in FIG. 6A, FIG. 6C and FIG. 6D, the partially overlapped first light emitting devices LE1, second light emitting devices LE2 and third light emitting devices LE3 are roughly overlapped in the side view angle of FIG. 6A, and present a two-dimensional symmetrical configuration. That is, in this embodiment, since the first region R1 and the second region R2 of the light splitting element 620 present a two-dimensional symmetrical configuration centered on the center of the light splitting element 620, the first light emitting devices LE1, the second light emitting devices LE2 and the third light emitting devices LE3 of the first light source unit 611 and the second light source unit 612 also respectively and correspondingly present a two-dimensional symmetrical configuration.

In this way, as shown in FIG. 6A, the light source module 600 is provided with the first light source unit 611, the second light source unit 612, and the first region R1 and the second region R2 of the light splitting element 620 corresponding with each other, so that the first color light beams R and the second color light beams G incident on the light splitting element 620 from different directions can be transmitted to the condenser lens 130 in the same direction after passing through the light splitting element 620. And, the distribution positions of the first color light beams R and the second color light beams G are symmetrical to each other by taking the line passing through the optical axis of the condenser lens 130 as a symmetric axis. In this way, the illumination beam 70 uniformly formed by the condenser lens 130 can have good uniformity and achieve functions and advantages similar to the aforementioned light source module 100, which are not repeated here. Furthermore, when the light source module 600 of FIG. 6A is applied to the projection apparatus 200, the projection apparatus 200 is capable of providing a uniform color display image frame, thereby improving the image quality and the user's visual perception, to achieve the aforementioned functions and advantages, which are not repeated here.

Figure 7A:
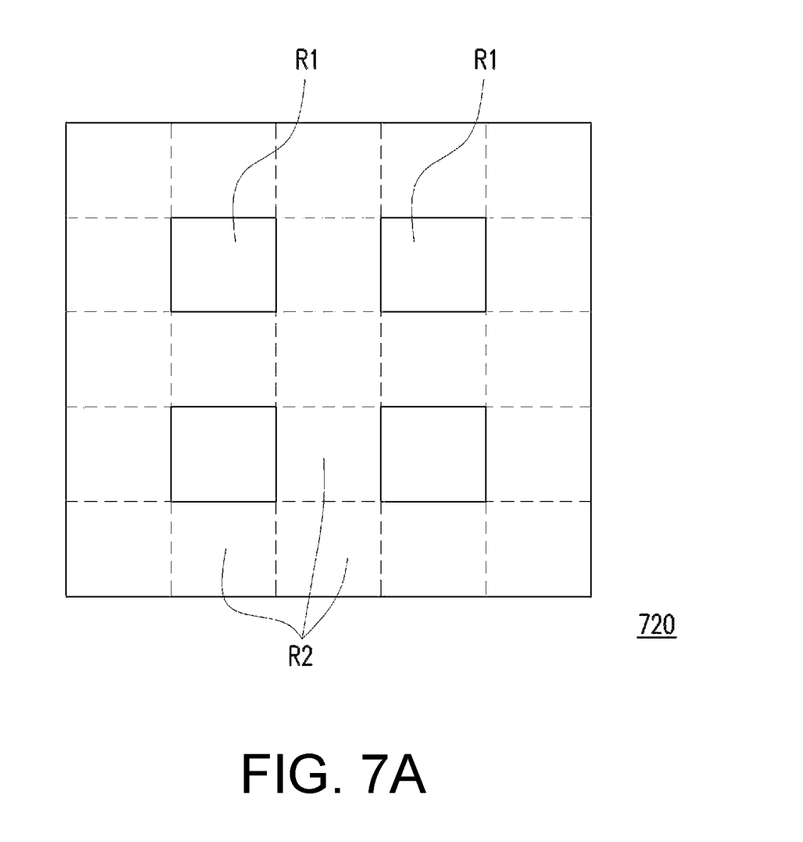
FIG. 7A is a top view of another light splitting element according to an embodiment of the disclosure.
Figure 7B:
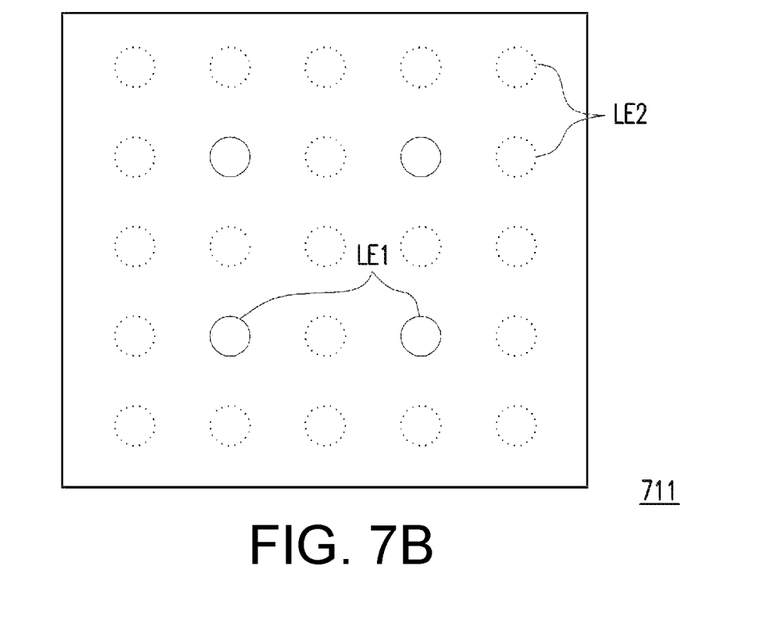
FIGS. 7B and 7C are top views of the first light source unit and the second light source unit of FIG. 7A, respectively.
Figure 7C:
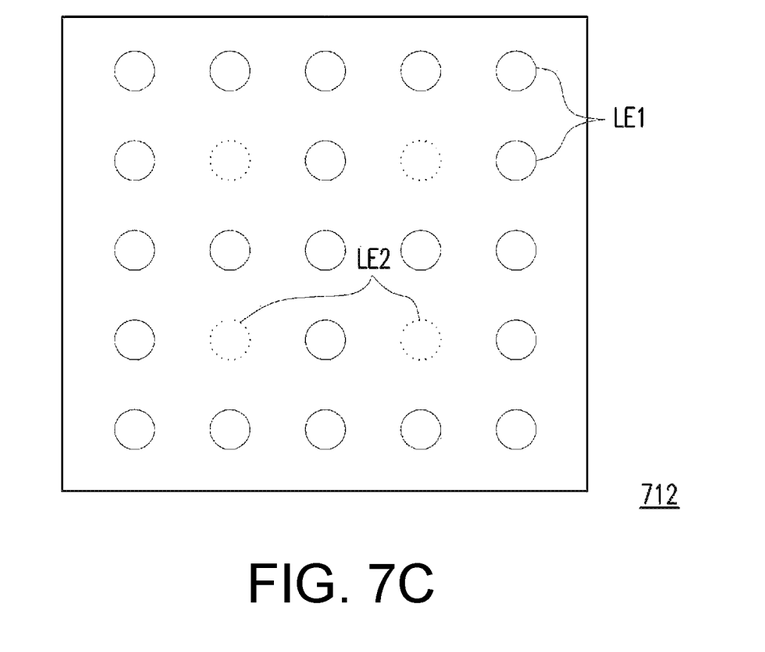

FIG. 7A is a top view of another light splitting element according to an embodiment of the disclosure. FIG. 7B is a top view of the first light source unit of FIG. 7A. FIG. 7C is a top view of the second light source unit of FIG. 7A. Referring to FIG. 7A, the light splitting element 720 of FIG. 7A is similar to the light splitting element 620 of FIG. 6B, and the differences are as follows. Specifically, as shown in FIG. 7A, in this embodiment, the light splitting element 720 has multiple first regions R1 and multiple second regions R2, and the first regions R1 and the second regions R2 are uniformly distributed on the light splitting element 720. More specifically, as shown in FIG. 7A, in this embodiment, the first regions R1 and the second regions R2 of the light splitting element 720 take the center of the light splitting element 720 as a center to present a two-dimensional symmetrical configuration. Moreover, as shown in FIG. 7B and FIG. 7C, in this embodiment, the first light emitting devices LE1 and the second light emitting devices LE2 of the first light source unit 711 and the second light source unit 712 also present two-dimensional symmetrical configuration. In an embodiment, the first light source unit 711 or/and the second light source unit 712 may provide the first light emitting devices LE1, the second light emitting devices LE2 and the third light-emitting devices LE3, arranged in a two-dimensional symmetrical manner on the first light source unit 711 or/and the second light source unit 712, which are not repeated here. Thus, when the first light source unit 711, the second light source unit 712 and the light splitting element 720 are applied to the light source module 600 of FIG. 6A, the light source module 600 can achieve the aforementioned functions and advantages through the first light source unit 711, the second light source unit 712 and the first region R1 and the second region R2 of the light splitting element 720 corresponding to each other, which will not be repeated here. Moreover, when the light source module 600 using the first light source unit 711, the second light source unit 712 and the light splitting element 720 is applied to the projection apparatus 200, the projection apparatus 200 may also provide a display image frame with uniform colors, thereby improving the image quality and the user's visual perception, and can achieve the aforementioned functions and advantages, which will not be repeated here.

In summary, the embodiments of the disclosure have at least one of the following advantages or effects. In the embodiment of the disclosure, the projection apparatus and the light source module are provided with the first light source unit, the second light source unit and the light splitting element corresponding with each other, so that the first color light beams and the second color light beams incident on the light splitting element from different directions can be transmitted to the condenser lens in the same direction after passing through the light splitting element. And, the distribution positions of the first color light beams and the second color light beams are symmetrical to each other by taking the line passing through the optical axis on the light incident surface (or the light exit surface) of the condenser lens as a symmetric axis. Therefore, the projection apparatus adopting the light source module is capable of providing a display image frame with uniform color, and thereby improving the image quality and the user's visual perception.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A light source module, comprising a light source unit, a light splitting element, and a condenser lens, wherein
the light source unit is configured to provide a plurality of first color light beams and a plurality of second color light beams, and the light source unit comprises a first light source unit and a second light source unit, wherein,
the first light source unit is configured to provide a first sub-light beam and a second sub-light beam, and the first sub-light beam and the second sub-light beam are emitted from the first light source unit along a first direction; and
the second light source unit is configured to provide a third sub-light beam and a fourth sub-light beam, the third sub-light beam and the fourth sub-light beam are emitted from the second light source unit along a second direction, the plurality of first color light beams comprise the first sub-light beam and the third sub-light beam, and the plurality of second color light beams comprise the second sub-light beam and the fourth sub-light beam;

the light splitting element is located on transmitting paths of the plurality of first color light beams and the plurality of second color light beams; and the condenser lens is located on the transmitting paths of the plurality of first color light beams and the plurality of second color light beams, wherein the first sub-light beam is transmitted to the condenser lens after being reflected by the light splitting element, and the third sub-light beam is transmitted to the condenser lens after passing through the light splitting element, wherein the light splitting element comprises a first region and a second region, the first region and the second region are respectively disposed corresponding to the first light source unit and the second light source unit, wherein the first region of the light splitting element reflects the first sub-light beam emitted from the first light source unit and allows the fourth sub-light beam emitted from the second light source unit to pass through, and the second region of the light splitting element reflects the second sub-light beam emitted from the first light source unit and allows the third sub-light beam emitted from the second light source unit to pass through.

2. The light source module according to claim 1, wherein the first sub-light beam and the fourth sub-light beam are incident in the first region of the light splitting element, the second sub-light beam and the third sub-light beam are incident in the second region of the light splitting element.

3. The light source module of claim 1, wherein the light splitting element has a first surface and a second surface opposite to each other, the first surface faces the condenser lens, the first light source unit faces the first surface, the second light source unit faces the second surface, and the plurality of first color light beams and the plurality of second color light beams exit the light splitting element via the first surface.

4. The light source module according to claim 1, wherein the light source unit is further configured to provide at least one third color light beam, one of the first region and the second region of the light splitting element is configured to allow the at least one third color light beam to pass through, and the other of the first region and the second region of the light splitting element is configured to reflect the at least one third color light beam.

5. The light source module according to claim 4, wherein the at least one third color light beam is provided by the first light source unit and/or the second light source unit, when the second light source unit provides the at least one third color light beam, the at least one third color light beam is incident in one of the first region and the second region of the light splitting element and is transmitted through the light splitting element; or when the first light source unit provides the at least one third color light beam, the at least one third color light beam is incident on the other of the first region and the second region of the light splitting element and is reflected by the light splitting element.

6. The light source module according to claim 1, wherein the light splitting element includes a first sub-light splitting element and a second sub-light splitting element, and the first sub-light splitting element is provided with the first region, the second sub-light splitting element is provided with the second region, and the first sub-light splitting element and the second sub-light splitting element are arranged with a spacing therebetween.

7. The light source module according to claim 1, wherein one of the first region and the second region is located in a center of the light splitting element, and the other of the first region and the second region surrounds the one of the first region and the second region.

8. The light source module according to claim 1, wherein the first sub-light beam is transmitted to a first position of the condenser lens, and the third sub-light beam is transmitted to a third position of the condenser lens, the first position and the third position are symmetrical to each other by taking a line passing through an optical axis on a light incident surface or a light exit surface of the condenser lens as a symmetry axis.

9. The light source module according to claim 8, wherein the first light source unit and the second light source unit respectively comprise a plurality of first light emitting devices for providing the first sub-light beam and the third sub-light beam, a maximum distance between the plurality of first light emitting devices of the first light source unit is defined as a first size, a maximum distance between the plurality of first light emitting devices of the second light source unit is defined as a second size, the first position and the third position of the first sub-light beam and the third sub-light beam form a first color distribution area on the condenser lens, and a size of the first color distribution area is greater than or equal to a sum of the first size and the second size.

10. The light source module according to claim 1, wherein neither a semi-reflecting element nor a dichroic mirror is provided between the light splitting element and the condenser lens.

11. A projection apparatus, comprising a light source module, a light valve and a projection lens, wherein the light source module is configured to provide an illumination beam, the light source module comprising a light source unit, a light splitting element, and a condenser lens, wherein the light source unit is configured to provide a plurality of first color light beams and a plurality of second color light beams, and the light source unit comprises a first light source unit and a second light source unit, wherein, the first light source unit is configured to provide a first sub-light beam and a second sub-light beam, and the first sub-light beam and the second sub-light beam are emitted from the first light source unit along a first direction; and the second light source unit is configured to provide a third sub-light beam and a fourth sub-light beam, the third sub-light beam and the fourth sub-light beam are emitted from the second light source unit along a second direction, the plurality of first color light beams comprise the first sub-light beam and the third sub-light beam, and the plurality of second color light beams comprise the second sub-light beam and the fourth sub-light beam;

the light splitting element is located on transmitting paths of the plurality of first color light beams and the plurality of second color light beams; and the condenser lens is located on the transmitting paths of the plurality of first color light beams and the plurality of second color light beams, wherein the first sub-light beam is transmitted to the condenser lens after being reflected by the light splitting element, and the third sub-light beam is transmitted to the condenser lens after passing through the light splitting element, wherein the light splitting element comprises a first region and a second region, the first region and the second region are respectively disposed corresponding to the first light source unit and the second light source unit, wherein the first region of the light splitting element reflects the first sub-light beam emitted from the first light source unit and allows the fourth sub-light beam emitted from the second light source unit to pass through, and the second region of the light splitting element reflects the second sub-light beam emitted from the first light source unit and allows the third sub-light beam emitted from the second light source unit to pass through;

the light valve is disposed on a transmitting path of the illumination beam, and is configured to convert the illumination beam into an image beam; and the projection lens is disposed on a transmission path of the image beam and is configured to project the image beam out of the projection apparatus.

12. The projection apparatus according to claim 11, wherein the first sub-light beam and the fourth sub-light beam are incident in the first region of the light splitting element, the second sub-light beam and the third sub-light beam are incident in the second region of the light splitting element.

13. The projection apparatus according to claim 11, wherein the light splitting element has a first surface and a second surface opposite to each other, the first surface faces the condenser lens, the first light source unit faces the first surface, the second light source unit faces the second surface, and the plurality of first color light beams and the plurality of second color light beams exit the light splitting element via the first surface.

14. The projection apparatus according to claim 11, wherein the light source unit is further configured to provide at least one third color light beam, one of the first region and the second region of the light splitting element is configured to allow the at least one third color light beam to pass through, and the other of the first region and the second region of the light splitting element is configured to reflect the at least one third color light beam.

15. The projection apparatus according to claim 14, wherein the at least one third color light beam is provided by the first light source unit and/or the second light source unit, when the second light source unit provides the at least one third color light beam, the at least one third color light beam is incident in one of the first region and the second region of the light splitting element and is transmitted through the light splitting element; or when the first light source unit provides the at least one third color light beam, the at least one third color light beam is incident on the other of the first region and the second region of the light splitting element and is reflected by the light splitting element.

16. The projection apparatus according to claim 11, wherein the light splitting element includes a first sub-light splitting element and a second sub-light splitting element, and the first sub-light splitting element is provided with the first region, the second sub-light splitting element is provided with the second region, and the first sub-light splitting element and the second sub-light splitting element are arranged with a spacing therebetween.

17. The projection apparatus according to claim 11, wherein one of the first region and the second region is located in a center of the light splitting element, and the other of the first region and the second region surrounds the one of the first region and the second region.

18. The projection apparatus according to claim 11, wherein the first sub-light beam is transmitted to a first position of the condenser lens, and the third sub-light beam is transmitted to a third position of the condenser lens, the first position and the third position are symmetrical to each other by taking a line passing through an optical axis on a light incident surface or a light exit surface of the condenser lens as a symmetry axis.

19. The projection apparatus according to claim 18, wherein the first light source unit and the second light source unit respectively comprise a plurality of first light emitting devices for providing the first sub-light beam and the third sub-light beam, a maximum distance between the plurality of first light emitting devices of the first light source unit is defined as a first size, a maximum distance between the plurality of first light emitting devices of the second light source unit is defined as a second size, the first position and the third position of the first sub-light beam and the third sub-light beam form a first color distribution area on the condenser lens, and a size of the first color distribution area is greater than or equal to a sum of the first size and the second size.

20. The projection apparatus according to claim 11, wherein neither a semi-reflecting element nor a dichroic mirror is provided between the light splitting element and the condenser lens.

\* \* \* \* \*